F. HARDINGE.
GEAR MECHANISM FOR LATHES.
APPLICATION FILED MAR. 22, 1919.

1,362,790.

Patented Dec. 21, 1920.
3 SHEETS—SHEET 1.

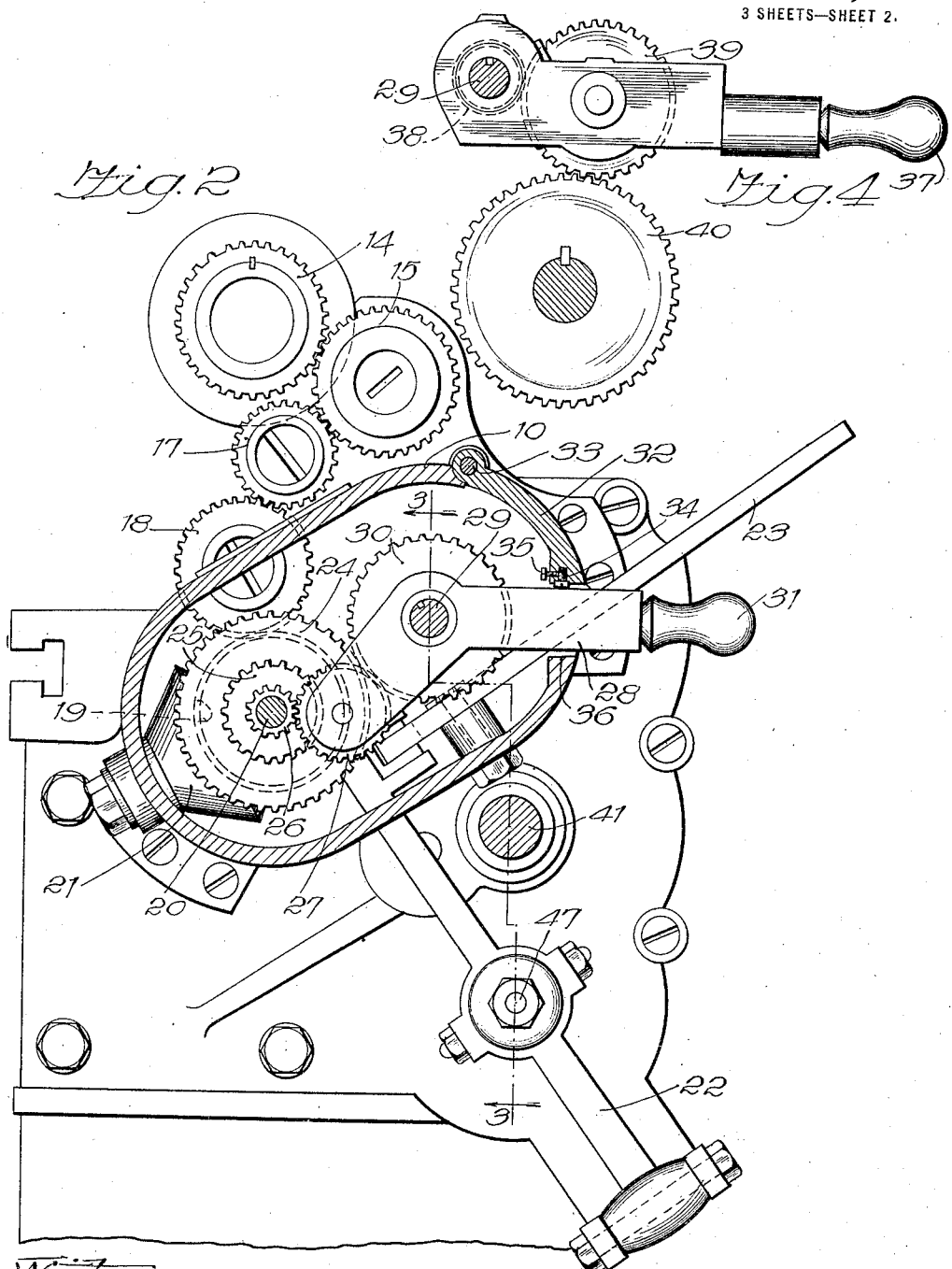

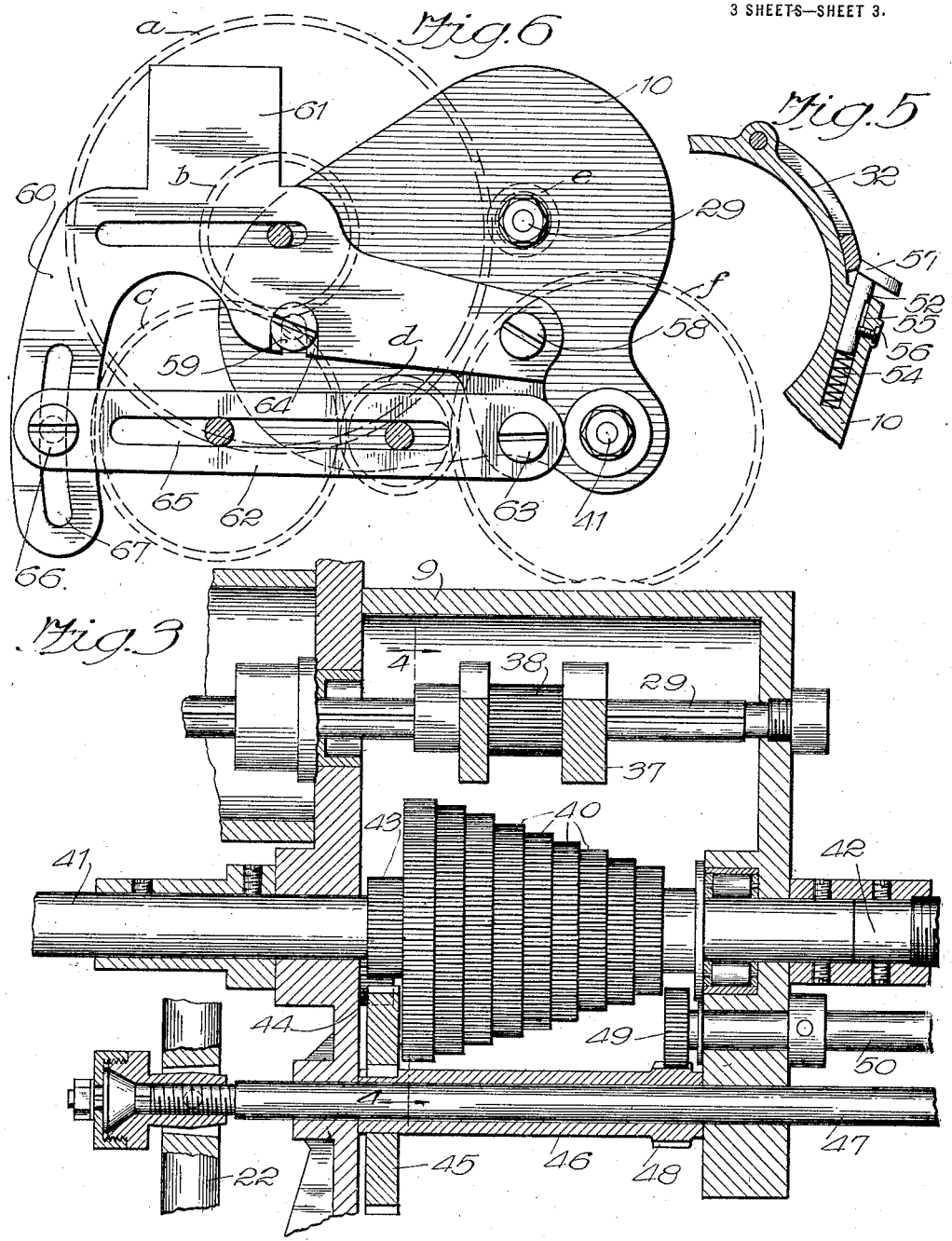

UNITED STATES PATENT OFFICE.

FRANKLIN HARDINGE, OF CHICAGO, ILLINOIS.

GEAR MECHANISM FOR LATHES.

1,362,790.  Specification of Letters Patent.  Patented Dec. 21, 1920.

Original application filed January 28, 1915, Serial No. 4,841. Divided and application filed October 12, 1917, Serial No. 196,200. Divided and this application filed March 22, 1919. Serial No. 284,392.

*To all whom it may concern:*

Be it known that I, FRANKLIN HARDINGE, a citizen of the United States, residing at Chicago, in the county of Cook and State of Illinois, have invented a certain new and useful Improvement in Gear Mechanism for Lathes, of which the following is a full, clear, concise, and exact description, reference being had to the accompanying drawings, forming a part of this specification.

My invention relates to precision lathes, and has for its general object the provision of improved devices for changing the gear ratio between the head stock spindle of the lathe and the lead screw or feed rod.

The present application is a division of my application Serial No. 196,200, filed October 12, 1917, which in turn is a division of my application Serial No. 4841, filed January 28, 1915. Specifically one of the objects of the present invention is the provision of improved arrangements which facilitate the cutting of metric threads upon lathes designed to cut English threads. In order to obtain any gear ratio which cannot be had through the transmission gearing permanently located in the lathe bed, I provide a certain improved bracket, which I shall refer to hereafter as the metric bracket, upon which may be mounted gears for obtaining the desired ratio. This bracket is made adjustable so that any sized gears may be mounted thereon. The transmission change gear casing of the lathe is provided with a cover having its lower edge provided with a series of steps adapted to coöperate with a series of steps provided in the casing to form a plurality of apertures, through which a change speed lever is arranged to extend. As is common in lathes, the change speed lever above referred to is provided with one or more intermediate gears adapted to mesh with certain gears carried by the lathe bed. It is essential that when a change speed lever of this kind is employed, the lever assume a certain position in order that the intermediate gears may mesh properly with the transmision gears within the casing. With this point in view I provide a plurality of adjusting screws on the cover or on the casing, each of the screws being arranged to engage the handle and hold it in the desired position.

These and other objects of the present invention will be pointed out more clearly in connection with the accompanying drawings, wherein:

Fig. 2 is an end elevational view of Fig. 1, some of the parts being shown in section to illustrate more clearly the internal construction;

Fig. 3 is a vertical cross sectional view taken along the line 3—3 of Fig. 2, looking in the direction indicated by the arrows;

Fig. 4 is a detail cross sectional view taken along line 4—4 of Fig. 3, looking in the direction indicated by the arrows;

Fig. 5 is a detail view of one of the change speed covers and its coöperating locking plunger; and Fig. 6 is an enlarged end view of the lathe, showing the metric bracket mounted thereon.

Similar characters of reference refer to similar parts throughout the several views.

Figure 1:
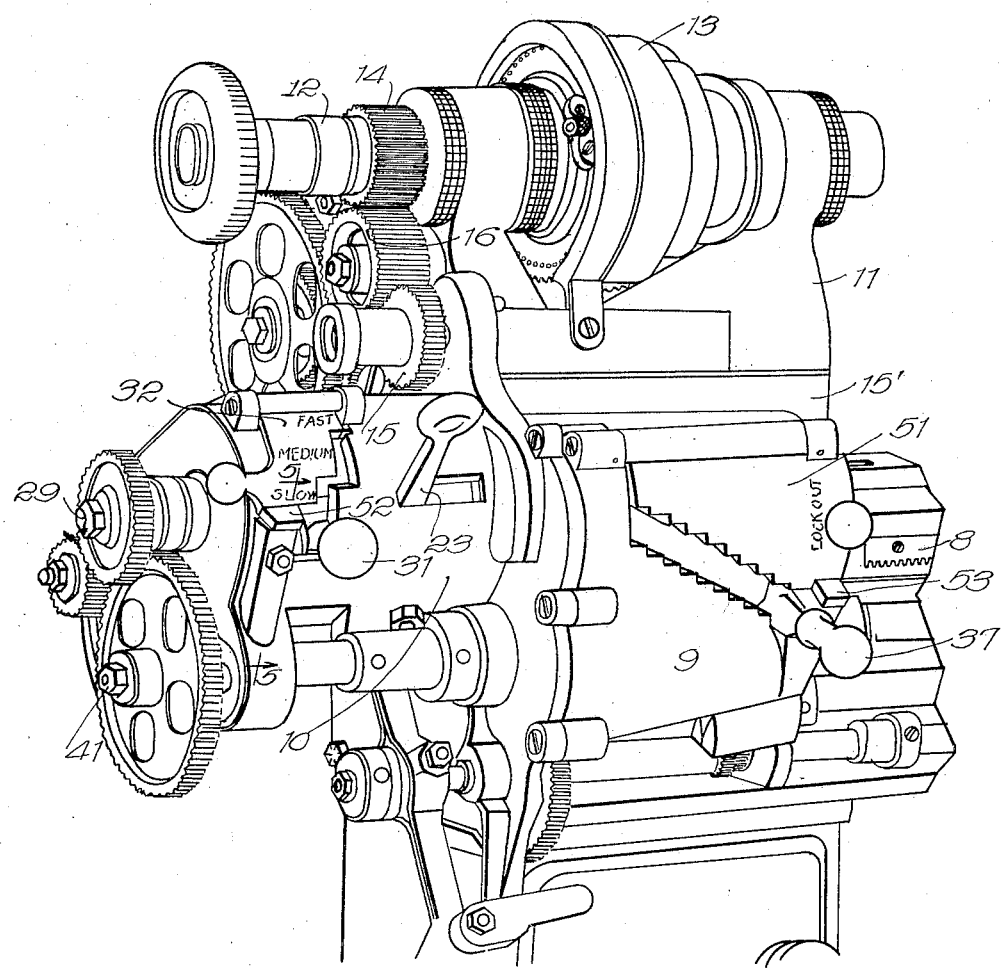
Figure 1 is a perspective view of the head stock end of a lathe provided with the mechanism of my invention.

Referring first to Fig. 1, 8 designates a lathe bed carrying the gear casings shown at 9 and 10. Mounted on the upper side of the lathe bed is a head stock 11 carrying a head stock spindle 12, upon which is mounted the usual cone pulley shown at 13. The head stock spindle 12 carries a gear 14, which is keyed to the spindle so as to rotate therewith. The entire head stock 11 is adapted to be raised or lowered by the insertion or removal of a raising block shown at 15'. This raising block forms no part of the present invention, and is shown and described in detail in application Serial No. 4841 hereinbefore referred to. When the lathe head stock is in its elevated position, as shown in Fig. 1, the gear 14 drives the gear 15 through a pair of intermediate gears, one of which is shown at 16. This gear mechanism forms no part of the present invention, and need not therefore be described in detail. When the raising block 15' is removed and the head stock 11 placed in its low-swing position, the gear 14 meshes with the gear 15, as most clearly shown in Fig. 2. Meshing with the gear 15 is an intermediate gear 17, in turn meshing with the gear 18. The gear 18 extends through the casing 10, and meshes with a gear 19 loosely mounted on a shaft 20. The gear 19 coöperates with three bevel gears, one of which is shown at 21, to facilitate rotation of the shaft 20 in either direction, connection between the gear 18 and the shaft 20 being provided by either one of the pair of levers shown at 22 and 23. Keyed to the shaft 20 are three different gear wheels 24, 25 and 26, each of which is adapted to mesh with a gear 27 carried at the inner end of the bell-crank lever 28. The lever 28 is mounted for oscillation upon the shaft 29, to which is keyed a gear 30 meshing with the gear 27. The outer end of the bell-crank lever carries a handle 31, which projects through the casing, as most clearly shown in Figs. 1 and 2.

The lower edge of the opening provided in the casing 10 through which the handle 31 extends, is of step-like formation, as shown in Fig. 1, and this series of steps, together with similar steps provided on the cover 32, form three openings through which the handle 31 may extend. The cover 32 is pivoted to the casing 10 at 33, so that the cover may be swung upwardly to permit movement of the bell-crank lever to either one of the three positions, thus permitting the operator to cause the gear 27 to mesh with any one of the gears shown at 24, 25, and 26.

As most clearly illustrated in Fig. 2, each of the lever engaging surfaces of the cover 32 carries a screw 34, which is vertically adjustable in the cover, and which is held in place by the set screw 35. By manipulating the screw 34 and the set screw 35, the screw 34 may be arranged to engage the bell-crank lever 28 and hold it in the desired position. If desired, the casing may be provided with similar adjustable screws at the point illustrated at 36. This arrangement of adjustable screws makes it possible to hold the bell-crank lever 28 in proper position and thus insure proper meshing of the gears 27 and any one of the gears 24, 25 and 26.

The shaft 29, which I shall refer to hereinafter as the drive shaft, extends into the casing 9 and is there provided with a lever 37, which is loosely mounted on the shaft and arranged to move longitudinally relatively thereto. Mounted within the bifurcated end of the lever 37 and keyed to the shaft 29 is a gear 38 meshing with a gear 39 (Fig. 4) carried by the lever 37. The gear 39 is in turn arranged to mesh with any one of the stack of gears shown at 40. These gears 40 are rigidly mounted on the lead screw shaft 41, which extends outwardly through the casing 10, as shown in Fig. 1. The inner end of the lead screw shaft 41 is connected with the lead screw 42 in turn arranged to have connection with the lead screw carriage. The lead screw shaft 41 carries a gear 43 meshing with the intermediate gear 44, in turn meshing with the gear 45 mounted on a sleeve 46. The sleeve 46 is mounted around an automatic stop rod 47, and is provided with a pinion 48 meshing with a pinion 49 carried by the feed rod 50.

The lever 37 extends through the casing 9, as shown in Fig. 1, which is provided with a series of steps on a cover 51 similar in all respects to the cover 32 provided on the casing 10. To hold the covers 32 and 51 in closed position I provide the locking plungers shown at 52 and 53, one associated with each cover.

Fig. 5 shows the plunger 52 in detail. In this figure, 54 designates a bore provided in the casing 10, in which is reciprocably mounted the plunger 52. A spring is interposed between the lower end of the plunger 52 and the casing 10, for holding the plunger normally in the position shown. To prevent rotation of the plunger within the bore 10 a groove 55 is formed in the plunger, which coöperates with a screw 56 carried by the casing. The upper end of the plunger carries a finger piece 57, which permits the operator to depress the plunger for the purpose of swinging the change gear cover upwardly. As most clearly shown in Fig. 5 the plunger projects upwardly into the path of travel of the cover 32. In order to open the cover it is first necessary to depress the plunger. In closing the cover the cover is pressed downwardly with a little force to cause the plunger to move within the path of travel of the cover. When the cover has been moved to its fully closed position, it clears the plunger, which, due to the spring 54, is again returned to its locking position. This locking mechanism is new so far as I am aware, and although very simple in construction, is very effective in holding the cover securely in locked position, and at the same time permitting the cover to be opened quickly.

When it is desired to cut metric threads, some gear ratio other than that which can be obtained by the gears 24, 25 and 26 and the stack of gears shown at 40 must be maintained between the head stock spindle and the lead screw 42, and for the purpose of providing such gear ratio I employ the mechanism shown in Fig. 6. The outer face of the casing 10 carries two screws shown at 58 and 59. These screws are arranged to support a metric bracket 60. This bracket comprises the two members 61 and 62, pivoted together at 63. The screw 58 is arranged to extend through the member 61 and the screw 59 into a notch 64 in the member 61. The member 62 of the metric bracket is provided with a longitudinal slot 65 and a screw 66, extending through an arcuate slot 67 provided in the member 61. In obtaining the desired gear ratio between the drive shaft 29 and the lead screw of the shaft 41, the intermediate gears $a$, $b$, $c$ and $d$ shown in dotted lines in Fig. 6 are mounted on the metric bracket, as illustrated in dotted lines. The gears *a* and *d* mesh with the gears *e* and *f* respectively, carried by the shafts 29 and 41 respectively. The slots provided in the members 61 and 62 and the adjustability of the member 62 relatively to the part 61 makes it possible to mount gears of different size on the bracket and thus to secure any desired gear ratio between the shafts 29 and 41.

It will of course be understood that when the metric bracket is in use the lever 37 is shifted to the right in Fig. 3 to throw the gear 39 out of mesh with the gears 40.

Having thus described my invention, what I claim as new and desire to secure by Letters Patent of the United States is:

1. A system of gearing comprising the combination of a driving shaft and a driven shaft, a gear secured to each of said shafts, a pivotally mounted bracket, a bar pivotally mounted on said bracket, means for adjusting said bracket and bar about their respective pivot points, and means for adjustably securing gears on said bracket and bar to form a gear train between the gears on said driving and driven shafts.

2. A change-speed gearing comprising a pivotally mounted bracket, a bar pivotally mounted on said bracket, means for adjusting said bracket and bar about their respective pivot points, and means for adjustably securing gears to said bracket and bar in intermeshing relation.

3. A change-speed gearing comprising a bracket, a bar pivotally mounted on said bracket, means for adjusting said bar about its pivot point, and means for adjustably securing gears to said bracket and bar in intermeshing relation.

4. A system of gearing, comprising the combination of a driving shaft and a driven shaft, a gear secured to each of said shafts, a pivotally mounted bracket, a slot therein for adjustably securing gears to said bracket, a bar pivotally mounted on said bracket, an arcuate slot in said bracket to adjustably secure the end of said bar thereto, a slot in said bar for adjustably securing gears thereto in intermeshing relation with the gears on said bracket to form a gear train between the gears on said driving and driven shafts.

5. A system of gearing, comprising the combination of a driving shaft and a driven shaft, a gear secured to each of said shafts, a bracket, a slot therein for adjustably securing gears to said bracket, a bar pivotally mounted on said bracket, an arcuate slot in said bracket to adjustably secure the end of said bar thereto, a slot in said bar for adjustably securing gears thereto in intermeshing relation with the gears on said bracket to form a gear train between the gears on said driving and driven shafts.

6. A system of gearing, comprising the combination of a driving shaft and a driven shaft, a gear secured to each of said shafts, a bracket, a slot therein for adjustably securing gears to said bracket, a bar on said bracket, an arcuate slot in said bracket to adjustably secure the end of said bar thereto, a slot in said bar for adjustably securing gears thereto in intermeshing relation with the gears on said bracket to form a gear train between the gears on said driving and driven shafts.

7. A system of gearing, comprising the combination of a driving shaft and a driven shaft, a gear secured to each of said shafts, a bracket, a slot therein for adjustably securing gears to said bracket, a bar on said bracket, a slot in said bar for adjustably securing gears thereto in intermeshing relation with the gears on said bracket to form a gear train between the gears on said driving and driven shafts.

In witness whereof I hereunto subscribe my name this 11th day of March, 1919.

FRANKLIN HARDINGE.

Witnesses:
 EARL F. PIERCE,
 EDNA V. GUSTAFSON.